(12) United States Patent
Shrivastava et al.

(10) Patent No.: US 11,381,535 B2
(45) Date of Patent: Jul. 5, 2022

(54) COMPUTERIZED SYSTEM AND METHOD FOR DETERMINING AND DISPLAYING MESSAGE CONTENT IN A USER'S INBOX

(71) Applicant: YAHOO ASSETS LLC, Dulles, VA (US)

(72) Inventors: Utkarsh Shrivastava, San Jose, CA (US); Suhas Sadanandan, Pleasanton, CA (US); Kanika Shah, Sunnyvale, CA (US); Kevin Day, San Jose, CA (US); Yaqi Hu, Milpitas, CA (US)

(73) Assignee: YAHOO ASSETS LLC, Dulles (VA)

( * ) Notice: Subject to any disclaimer, the term of this patent is extended or adjusted under 35 U.S.C. 154(b) by 214 days.

(21) Appl. No.: 15/007,401

(22) Filed: Jan. 27, 2016

(65) Prior Publication Data
US 2017/0214647 A1    Jul. 27, 2017

(51) Int. Cl.
*H04L 51/42*    (2022.01)
*G06F 3/0482*   (2013.01)
(Continued)

(52) U.S. Cl.
CPC ............ *H04L 51/22* (2013.01); *G06F 3/0482* (2013.01); *G06F 3/0483* (2013.01); *G06Q 10/107* (2013.01); *G06Q 30/0277* (2013.01)

(58) Field of Classification Search
CPC ..... H04L 51/22; G06Q 10/107; G06F 3/0481; G06F 3/0482; G06F 3/0483; G06F 3/04842; G06F 2203/04803
See application file for complete search history.

(56) References Cited

U.S. PATENT DOCUMENTS 7,370,277 B1 * 5/2008 Canfield ............. G06Q 10/107
                                                       715/711
8,793,591 B1 * 7/2014 Coleman ............. G06F 3/0482
                                                       715/751
(Continued)

OTHER PUBLICATIONS

FLOSS Manuals, Thunderbird, Reading and Organizing Mail [online], FLOSS Manuals, 2010 [retrieved on Apr. 28, 2020], Retrieved from the Internet:< URL: http://write.flossmanuals.net/thunderbird/reading-and-organizing-mail/ > (Year: 2010).*

*Primary Examiner* — David S Posigian
(74) *Attorney, Agent, or Firm* — James J. DeCarlo; Greenberg Traurig, LLP

(57) ABSTRACT

Disclosed are systems and methods for improving interactions with and between computers in content communicating, displaying, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods determine and display message content within a portion of a message inbox in a manner that is specific to the type message content. According to some embodiments, when a message is received in a message inbox of a user, the message content can be opened for display within a dedicated portion of the inbox, thereby enabling improved message content retrieval, access and navigation within a message platform or message application.

17 Claims, 9 Drawing Sheets

(51) Int. Cl.
*G06Q 30/02* (2012.01)
*G06Q 10/10* (2012.01)
*G06F 3/0483* (2013.01)

(56) References Cited

U.S. PATENT DOCUMENTS

| | | | |
|---|---|---|---|
| 8,903,931 B1* | 12/2014 | Rothman | H04L 51/22 709/206 |
| 2003/0107593 A1* | 6/2003 | Domenico | G06F 3/0483 715/752 |
| 2004/0224662 A1* | 11/2004 | O'Neil | H04L 12/1403 455/408 |
| 2006/0230356 A1* | 10/2006 | Sauve | G06F 3/0481 715/777 |
| 2007/0005717 A1* | 1/2007 | LeVasseur | G06F 21/60 709/206 |
| 2007/0067733 A1* | 3/2007 | Moore | G06F 17/30899 715/777 |
| 2007/0283039 A1* | 12/2007 | Kim | H04L 51/066 709/238 |
| 2008/0005686 A1* | 1/2008 | Singh | G06F 3/0483 715/764 |
| 2009/0144655 A1* | 6/2009 | Hardy | G06Q 10/107 715/803 |
| 2009/0327947 A1* | 12/2009 | Schreiner | G06F 3/0483 715/777 |
| 2010/0268585 A1* | 10/2010 | Padveen | G06Q 10/107 705/14.16 |
| 2010/0274628 A1* | 10/2010 | Kunz | G06Q 10/107 705/14.53 |
| 2012/0173632 A1* | 7/2012 | Chakra | G06Q 10/107 709/206 |
| 2013/0290710 A1* | 10/2013 | Broder | H04L 63/102 713/168 |
| 2015/0033141 A1* | 1/2015 | Mishra | H04L 51/22 715/752 |
| 2015/0100644 A1* | 4/2015 | Gulik | H04L 51/22 709/206 |
| 2015/0185973 A1* | 7/2015 | Gilad | G06Q 10/107 715/752 |

\* cited by examiner

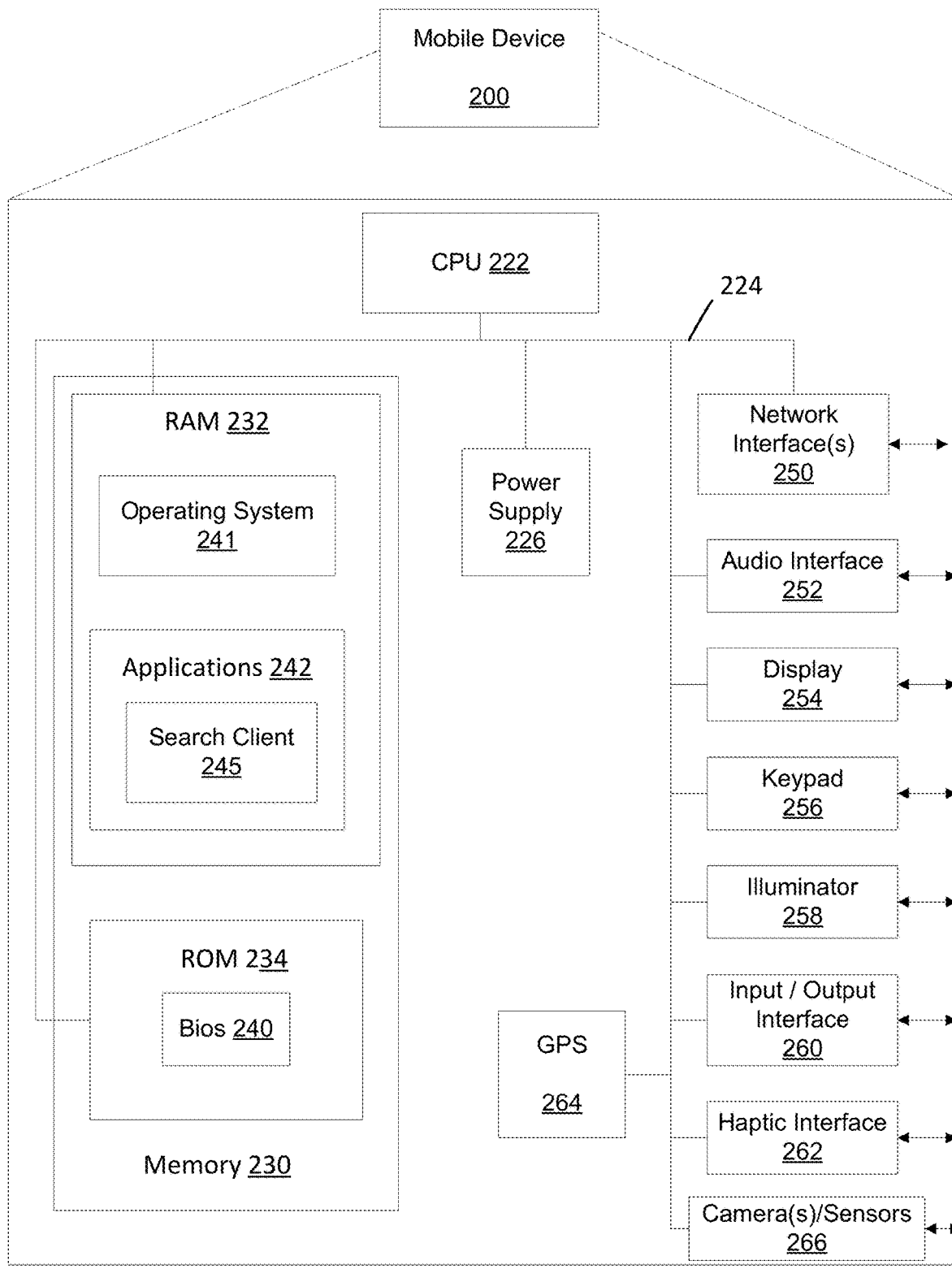

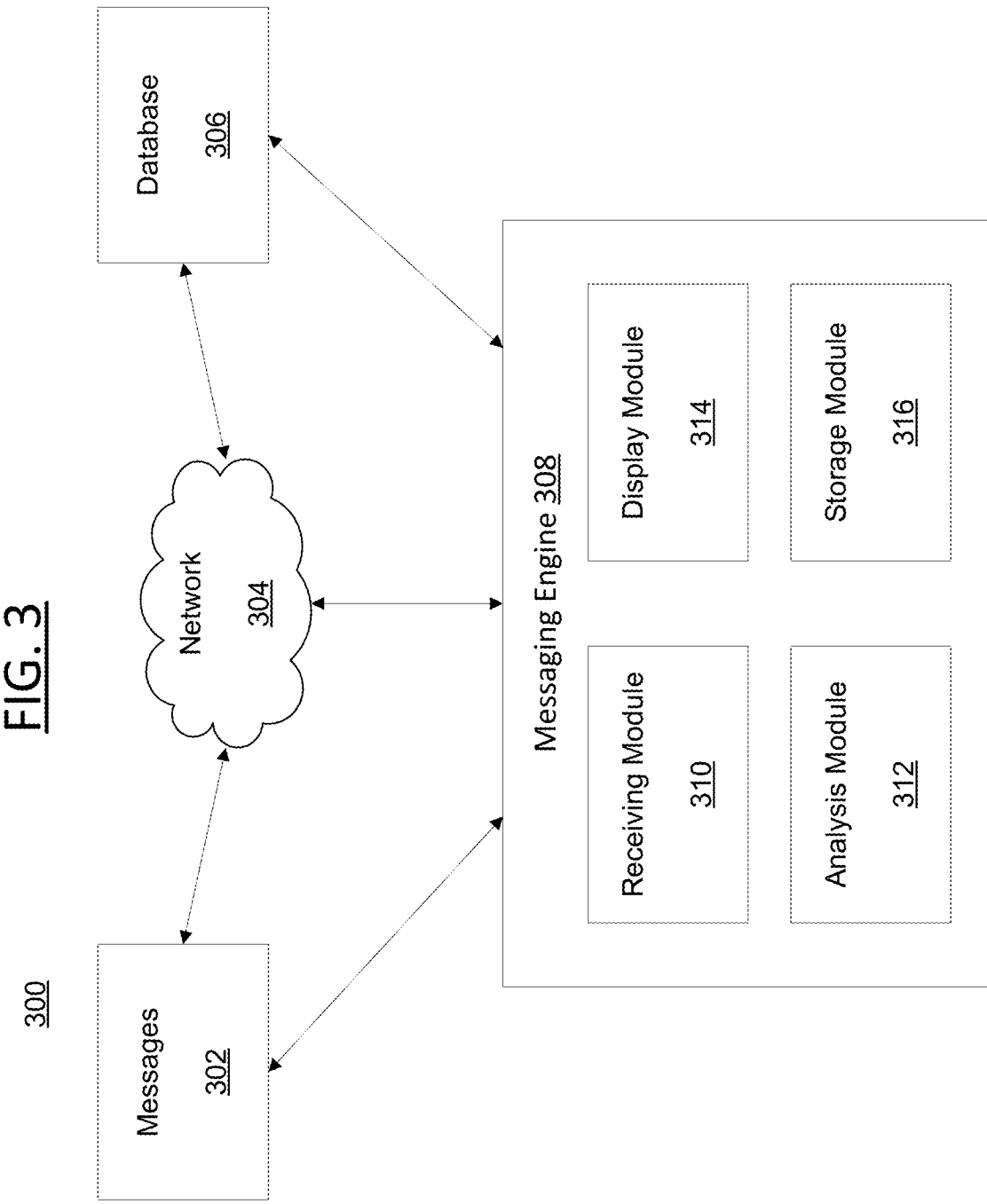

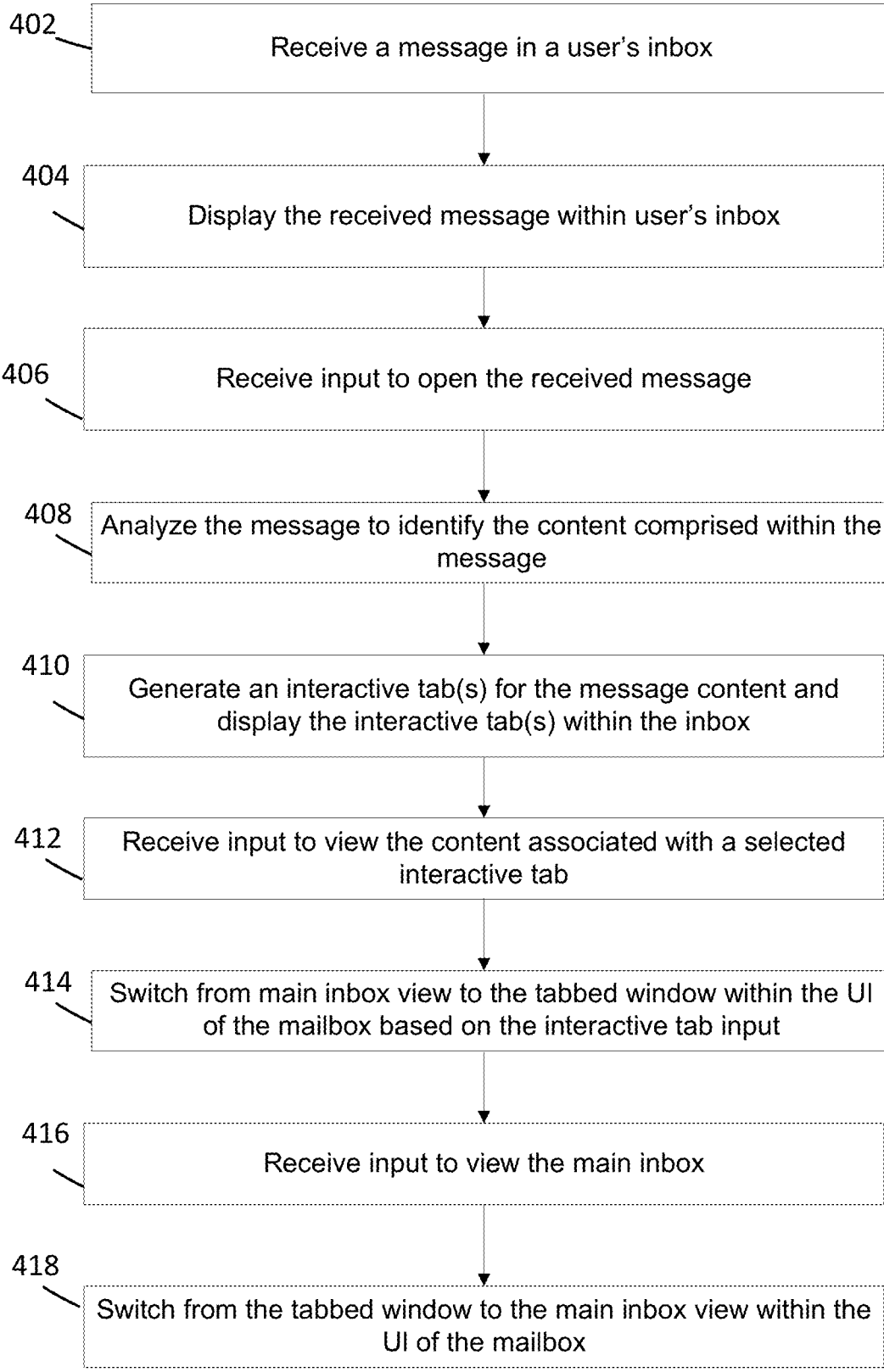

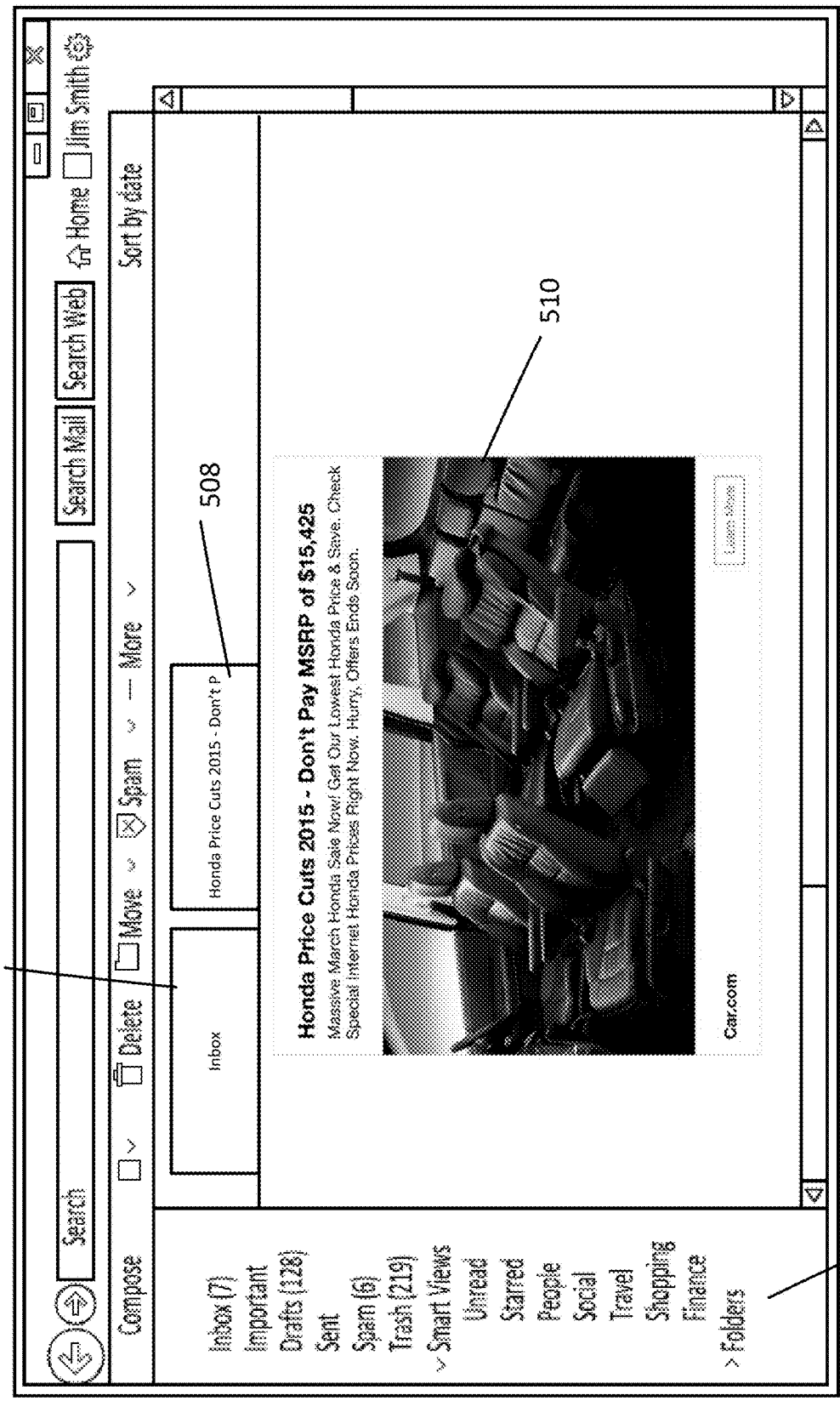

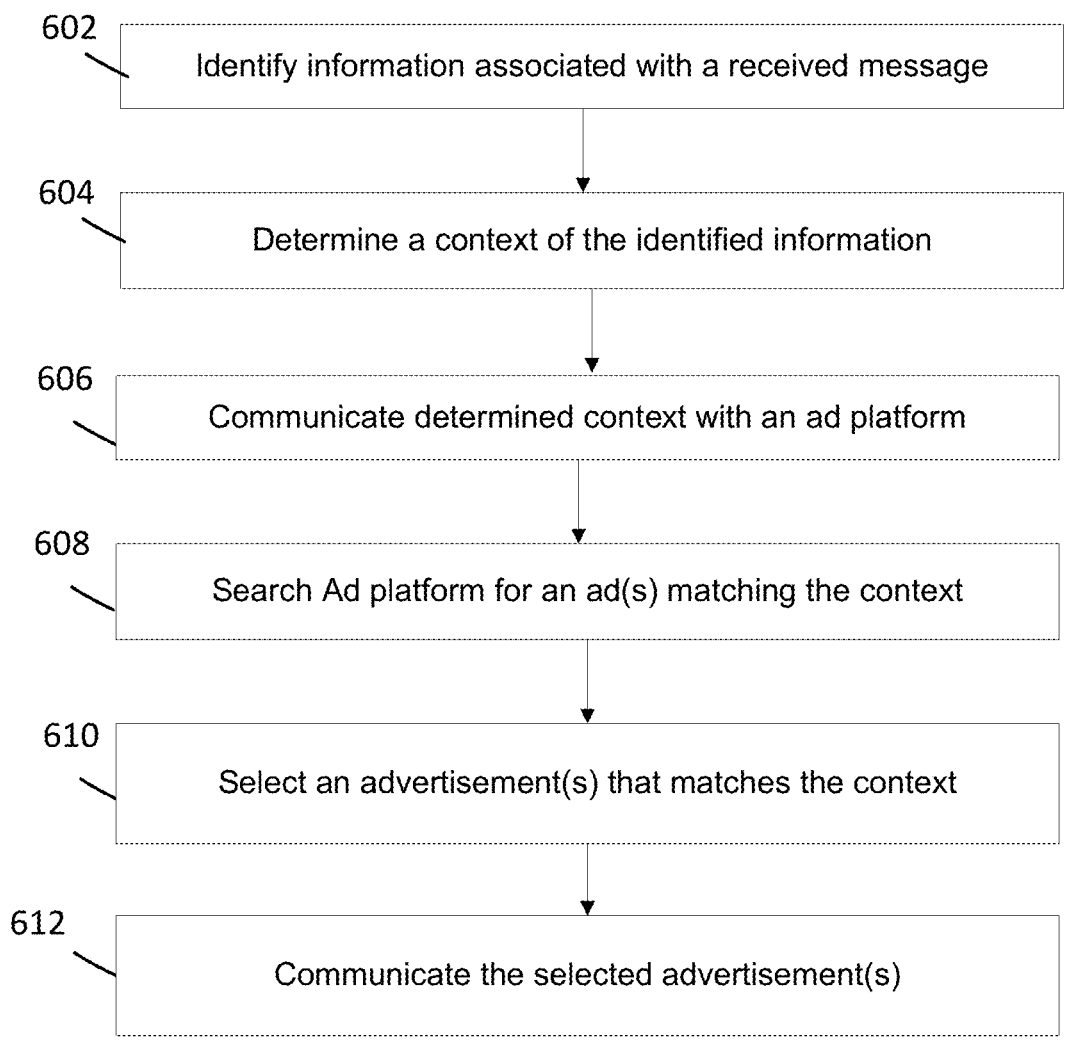

COMPUTERIZED SYSTEM AND METHOD FOR DETERMINING AND DISPLAYING MESSAGE CONTENT IN A USER'S INBOX

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content communicating, generating, providing and/or hosting computer systems and/or platforms by modifying the capabilities and providing non-native functionality to such systems and/or platforms for determining and displaying message content within a portion of a message inbox based on the type of message content.

SUMMARY

The present disclosure describes computer systems and methods that determine and display message content within a novel, dedicated and embedded portion of a message inbox. According to some embodiments of the instant disclosure, when a message addressed to a user's message inbox is received, the message content associated with such message is analyzed, extracted or otherwise identified, and such message content can be opened for display within in a dedicated portion of the inbox. Display of specific messages' content within the dedicated portion of the inbox frees up the user-interface (e.g., UI real-estate) in the user inbox, thereby enabling the simultaneous access to and display of a plurality of content items that were previously unavailable within conventional messaging platforms (or applications) prior to the advent of the disclosed systems and methods.

The message can be any type of message that is receivable within any known or to be known messaging or email system. The message content comprised within such messages can be any type of message content, such as, but not limited to, text, audio, video, graphics interchange format (GIF) files, digital advertisements, and/or any other type of known or to be known multimedia, or some combination thereof. The display of the message content within the novel, dedicated message inbox portion of the user's mailbox can applied to any type of message or communication system, application, platform, web-based system or service hosting and/or associated with a user's mailbox to improve that system's functionality.

While additional advances, benefits and improvements to existing technologies will discussed in more detail below, the disclosed systems and methods enable the delivery and seamless display of message content within a user's inbox by providing a dedicated portion for the display of such content. This enables, among other features and added functionality, a more efficient use of UI or screen "real estate" (e,g, the visible portion of an app on a screen or the screen itself when fully or partially utilized), and also enables a user to navigate through different messages and message content that are open at the same time on the user's device. The disclosed systems and methods enable improved message and message content navigation within a message platform or message application without requiring or having a user save, bookmark or otherwise identify the content for later viewing. Thus, the dedicated portion displaying the message/message content in the inbox enables the user to seamlessly and more rapidly navigate between the inbox and any open message.

According to some embodiments, in embodiments where the message content is associated with and/or contains or itself constitutes a digital advertisement media item (e.g., an HTML message), the ability for a user to navigate from his/her personal messages to the digital ad content displayed within the portion of the inbox enables the increase of valuable impressions of online media that can increase monetization through higher click-through-rates (CTRs) and increased return-on-investment (ROI), revenues, salience and relevance of served content/online media.

In accordance with one or more embodiments, a method is disclosed which includes determining and displaying message content within a novel, dedicated and embedded portion of a message inbox, as discussed herein.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for determining and displaying message content within a novel, dedicated and embedded portion of a message inbox.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating a client device in accordance with some embodiments of the present disclosure;

FIG. 3 is a schematic block diagram illustrating components of a system in accordance with embodiments of the present disclosure;

FIG. 4 is a flowchart illustrating steps performed in accordance with some embodiments of the present disclosure;

FIGS. 5A-5C illustrate non-limiting examples in accordance with some embodiments of the present disclosure;

FIG. 6 is a flowchart illustrating steps performed in accordance with some embodiments of the present disclosure.

DESCRIPTION OF EMBODIMENTS

Figure 1:
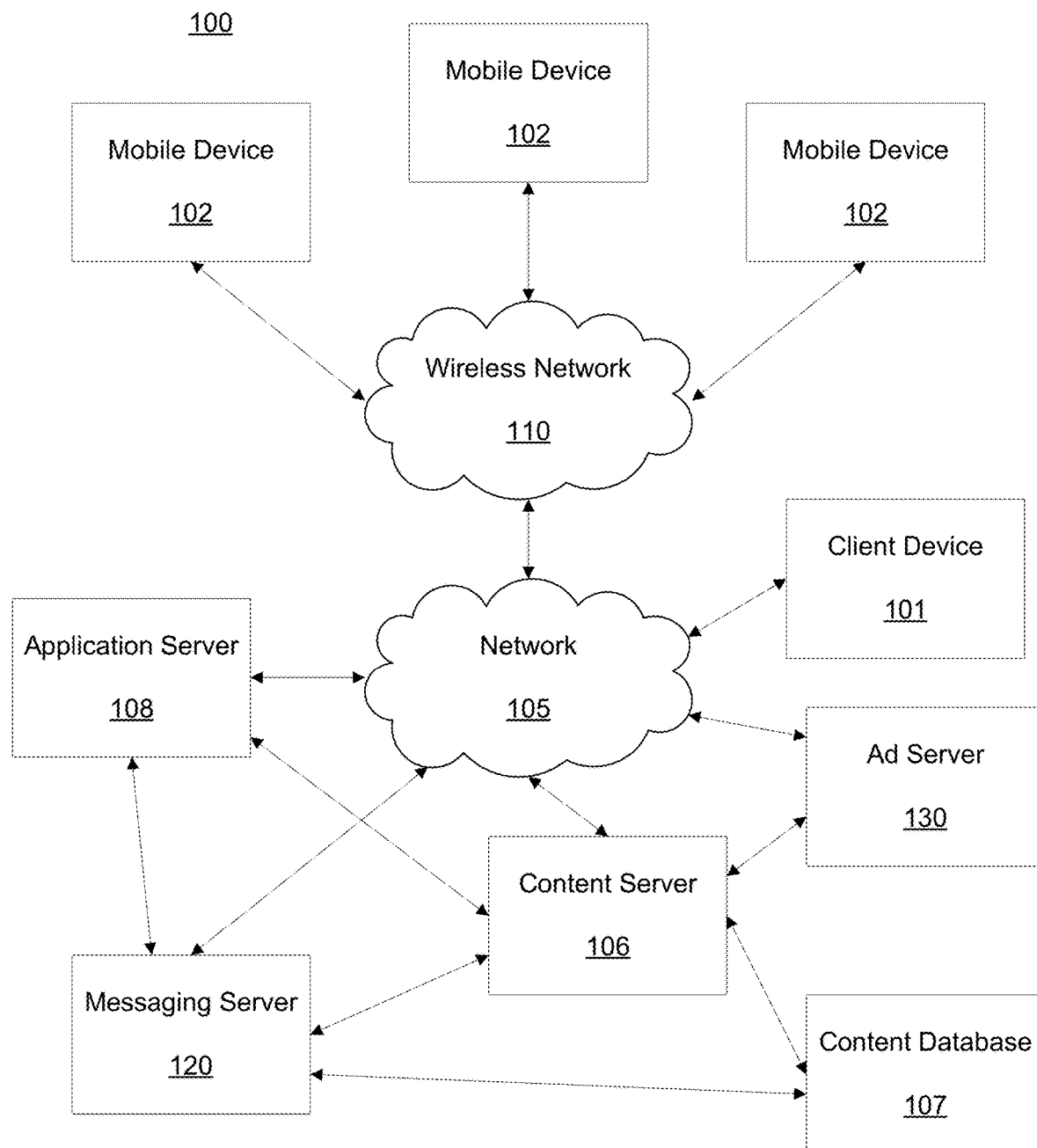
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS, Android®, or Windows® Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, marketing of products and services is ubiquitous across all Internet platforms. Internet advertising via ad servers has proven to be an effective and lucrative source of revenue. Advertising on the Internet provides the possibility of allowing advertisers to cost-effectively reach highly specific target audiences—as opposed to traditional broadcast and print advertising media that reach only broadly definable target audiences (e.g. television viewers in the greater New York area).

Conventional ad systems focus on serving digital advertisement content to users by implementing targeting and/or retargeting marketing tools which enables digital ads to be displayed within the user's inbox. Such conventional ad systems allow the user to view the ads in a particular email format, and once the digital ad content item is viewed, it is deleted (or "destroyed" such that it is un-retrievable after its initial viewing). In some instances, a user may desire to re-view the digital ad content item; however, currently the only reliable methods are to use the browser back button or click on the ad again, which most users will readily admit rarely works as the ad content item has expired. Such systems are inefficient and lead to increased costs for the advertiser and email marketer.

The present disclosure addresses the shortcomings in the art by providing improved systems and methods that enable message content to be viewable within a dedicated portion of a message inbox, which is dedicated to specific messages and is embedded as part of the inbox user interface (UI). The disclosed systems and methods provide improvements to, inter alia, message applications and platforms by displaying message content within the dedicated portion of the message inbox UI. In some embodiments, the message content displayable within the dedicated portion of the inbox is analyzed and must be of a certain content type. In some embodiments, the identification of the content that is to be displayed in the dedicated UI portion of the inbox is based on user input, which provides an indication that such content is being requested to be displayed in the dedicated UI portion. The display of particular message content within the dedicated UI portion enables multiple content items from multiple (i.e., different) messages to be open at the same time within the user's messaging inbox, all while the user is still able to view his/her traditional inbox of messages. This improved navigational functionality, which can be implemented within any known or to be known messaging application, system or platform, allows for multiple messages and/or multiple content items from multiple messages to be open at the same time within respective dedicated portions of the user's messaging inbox.

Figure 5A:
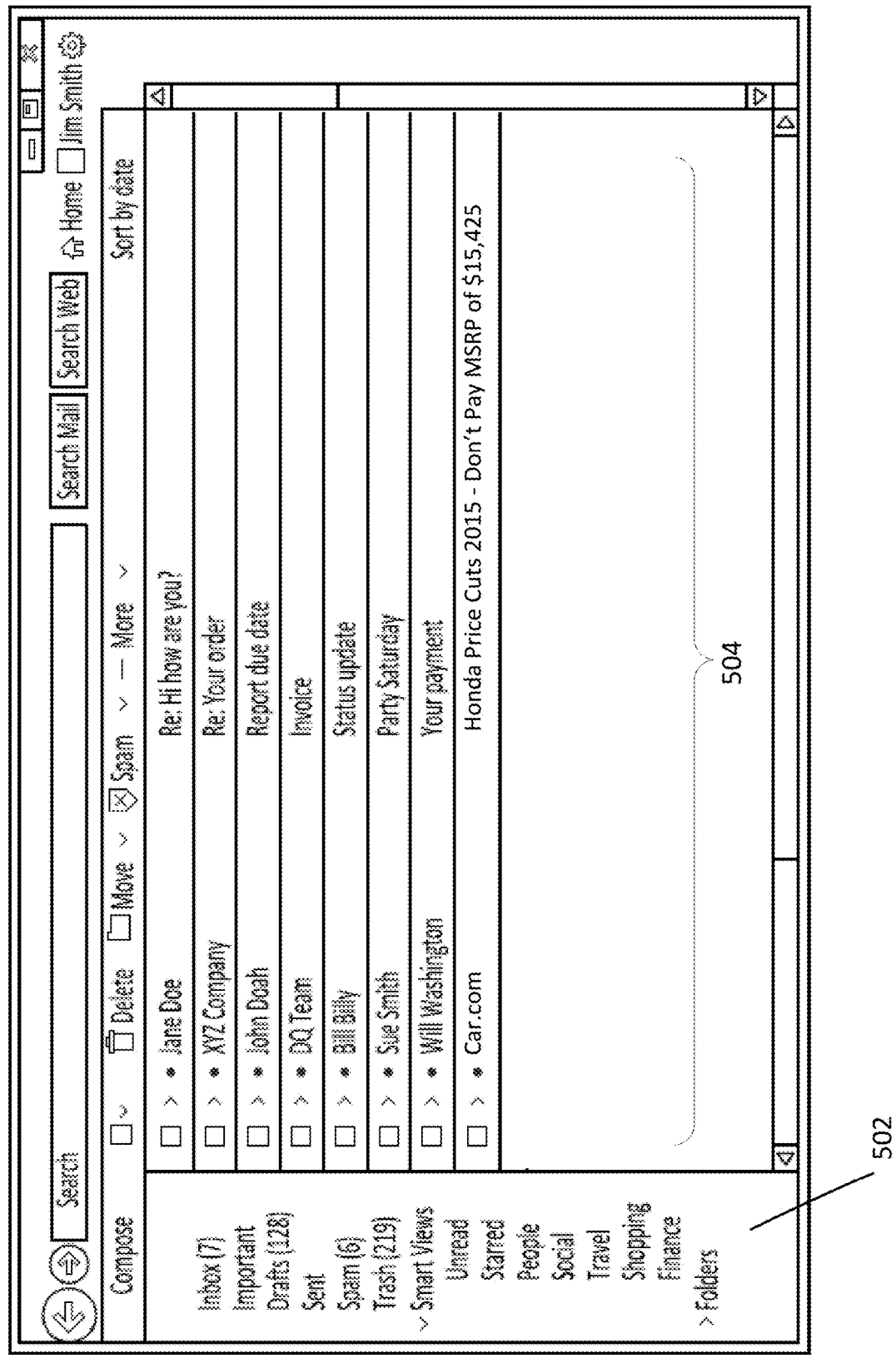

As understood by those of skill in the art, a messaging application has a displayable inbox user interface (UI) that provides a user with a display for viewing the messages he/she has received. For example, FIG. 5A displays a user's inbox 500, where the inbox includes a message directory 502 and message display area 504. Inbox 500 can be displayed within a messaging application executing on or in conjunction (e.g., web-based) with a user's device. For example, inbox 500 can be displayed within a browser being directed to messaging service's website (e.g., Yahoo! Mail® website: www.yahoo.com/mail). In another example, inbox can be displayed within a messaging application that is downloaded and executing on a user's mobile device (e.g., Yahoo! Mail® application downloaded from the iTunes® store).

According to embodiments of the instant disclosure, the dedicated UI portion of the inbox can have associated therewith a specific tab or modal window. That is, the inbox window is the parent (or main) window and the dedication UI portion is realized as a child window. Therefore, the content determined or identified to be displayed in the dedicated portion of the UI can be displayed in its own separate tab within the inbox UI. Therefore, the user can view the content (in the tab window) and switch back to the main inbox, and then switch back to the tab window to view the content again. Such functionality has never been implemented within mail or messaging systems, platforms or applications, as discussed above.

Figure 5B:
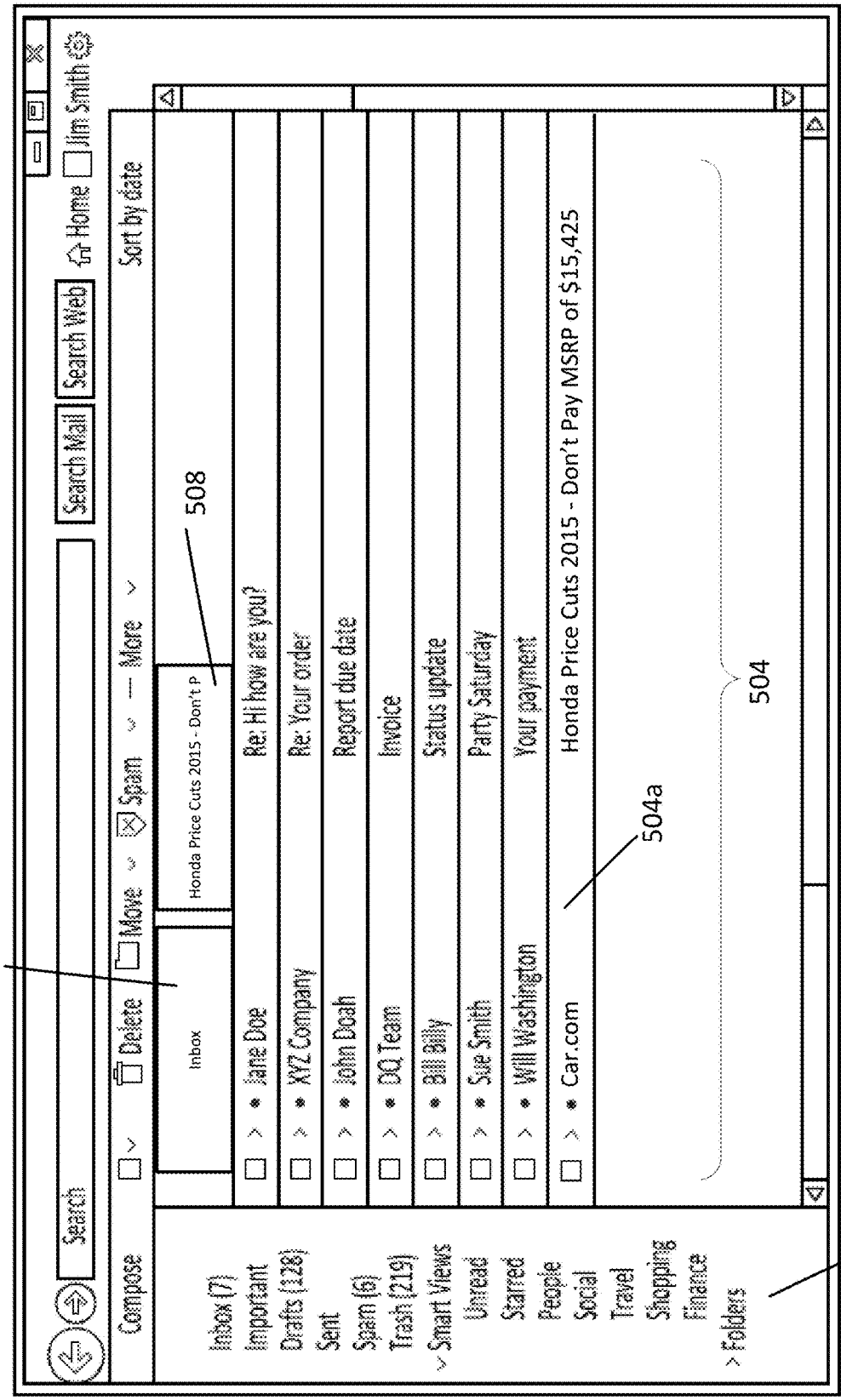

By way of a non-limiting example, as illustrated in FIGS. 5B-5C, user Jim Smith receives an email from "Car.com" about Honda® deals titled "Honda Price Cuts 2015—Don't Pay MSRP of $15,425". This message can be seen in item 504a within message display area 504. Prior to clicking on the message 504a and opening it, user Jim is presented with the inbox 500; however, upon clicking on the email, tab 508 is automatically generated and displayed within inbox 500, as does, in some embodiments, tab 506 which corresponds to the main inbox display—as illustrated in FIG. 5B. Tab 508's display comprises information that indicates that such tab is related to the selected message—for example, as illustrated in FIG. 5B, the tab comprises text related to the title of the message. From here, user Jim can provide input respective to the tab 508 in order for it to open or display the window that corresponds to its contents (e.g., double click, tap or otherwise select item 508 in FIG. 5B). In response to the input, user Jim is then displayed the inbox view of FIG. 5C. As illustrated in FIG. 5C, the content from the selected message 504a that corresponds to the generated tab (item 508) is displayed within the inbox—item 510. Content 510 is the content that is contained within the received message 504a. Therefore, instead of having to open and close such message in order to toggle back and forth between the message and the inbox message views (as with conventional systems), user Jim can navigate between the open message 504a and the main inbox 504 through the novel functionality provided by the disclosed systems and methods' tabs.

Therefore, as discussed in more detail below, the present disclosure describes computer systems and methods that can display message content via a novel tab functionality that was previously unavailable within messaging mailboxes. According to some embodiments of the instant disclosure, when a message addressed to a user's message inbox is received, the message content associated with such message can be analyzed, extracted or otherwise identified, and such message content can be opened for display within a dedicated tab (as illustrated in FIGS. 5B-5C). Display of specific messages' content within the dedicated tab(s) within the mailbox's interface enables a user to seamlessly navigate between different content that is open at the same time, as well as the main inbox view, without the need for saving or otherwise demarking such content for later viewing, which is novel messaging functionality not previously available to messaging users on conventional messaging systems.

In some embodiments, the messages being analyzed for display of their content within the tabbed viewing of the instant disclosure can be associated with digital advertisement messages (e.g., messages that comprise digital content items relating advertisement or promotional information or functionality). Therefore, while some conventional ad display systems only enable ads to be displayed as pop-up dialog boxes or windows, or within side-panes of displayed inbox UI's, the disclosed systems and methods enable digital ad content to be provided within a dedicated UI window (e.g., tabbed window) of the messaging inbox. This can effectuate an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical or electromagnetic sensors 266. Device 200 can include one camera 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

FIG. 3 is a block diagram illustrating the components of system 300 for performing the systems and methods discussed herein. FIG. 3 includes a plurality of messages 302, a network 304, a messaging engine 308 and a database 306 for storing messages and/or advertisement content. The messaging engine 308 can be a special purpose machine or processor, and could be hosted by a messaging server, web server, application server, content provider, email service provider, ad server, a user's computing device, or any combination thereof.

According to some embodiments, messaging engine 308 can be embodied as a stand-alone application that executes on a user device. In some embodiments, the messaging engine 308 can function as an application installed on the user's device, and in some embodiments, such application can be a web-based application accessed by the user device over a network. In some embodiments, the messaging engine 308 can be installed as an augmenting script, program or application to another media application (e.g., Yahoo Mail®, Yahoo! Messenger®, Skype®, WhatsApp®, Gmail®, Hotmail®, Twitter®, Instagram®, SnapChat®, Facebook®, and the like).

The plurality of messages 302 can be any type of known or to be known message. Examples of such messages 302 can include, but are not limited to, email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages 302 can be generated by the messaging engine 308, provided to the messaging engine 308 or accessed by a computer program or device that can access the messages. In some embodiments, the messages 302 can be stored in a database 306 of stored messages, which can be associated with an email provider, such as Yahoo! Mail®. The database 306 can be any type of database or memory that can store the messages 302, user profile information, digital ad content (data and metadata), and the like.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be generated, communicated and/or accessed and processed by the messaging engine 308 according to the systems and methods discussed herein.

The database 306 can be any type of database or memory, and can be associated with a server on a network which is providing messages 302, or other types of content or associated and/or affiliated content (e.g., content server 106, application server 108, ad server 130, messaging server 120, and the like). Database 306 comprises a dataset of information associated with user data and associated user metadata, message content associated with messages 302, digital ad content provided by ad server 130, or other types of messages delivered to a user's inbox, and the like. Such information can be stored in the database 306 independently and/or as a linked or associated dataset when such information is received, identified, generated and/or delivered to a user, as discussed in more detail below. As discussed above, it should be understood that the data (and metadata) in the database 306 can be any type of information and type, whether known or to be known, without departing from the scope of the present disclosure.

According to some embodiments, database 306 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying messages, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

In some embodiments, the information stored in database 306 can be represented as an n-dimensional vector (or feature vector), where the information associated with the stored information corresponds to a node(s) on the vector. As such, in some embodiments database 306 can store and index information in database 306 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion herein will focus on vector analysis, as discussed above, the stored information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the messaging engine 308, and the database of stored resources 306. Indeed, as illustrated in FIG. 3, the messaging engine 308, messages 302 and database 306 can be directly connected by any known or to be known method of connecting and/or enabling communication between such devices, hosting platforms, engines and resources, and the like.

The principal processor, server, or combination of devices that comprises hardware programmed in accordance with the special purpose functions herein, referred to for convenience as messaging engine 308, includes receiving module 310, analysis module 312, display module 314 and storage module 316. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 4-5C.

FIG. 4 is a process 400 diagram illustrating steps performed in accordance with embodiments of the present disclosure for displaying message content via an embedded tab generated and displayed within a message mailbox. According to some embodiments of the instant disclosure, as discussed herein, when a message addressed to a user's message inbox is received, the message content associated with such message can be analyzed, extracted or otherwise identified, and such message content can be opened for display within a dedicated tab (as illustrated in FIGS. 5B-5C). Display of specific messages' content within the dedicated tab(s) within the mailbox's interface enables a user to seamlessly navigate between different content that is open at the same time within the UI of a mailbox without the need for saving or otherwise bookmarking such content for later viewing.

For purposes of the discussion of FIG. 4, as discussed herein, the steps of Process 400 will be performed in accordance with a message platform, e.g., Yahoo!® Mail; however, as discussed above, it should not be construed to limit the scope of the disclosed systems and methods to solely a messaging platform, as any type of known or to be known content hosting, communication and/or delivery platform can be utilized for performing Process 400 without departing from the scope of the instant disclosure. Indeed, the disclosed systems and methods can be performed within and/or across any known or to be known messaging and/or marketing platform, application, service, system, and the like, as understood by those of skill in the art.

Furthermore, in some embodiments, the disclosed systems and methods can be performed from (or within) a single message platform, e.g., Yahoo! Mail®; and in some embodiments, across multiple platforms, such as Yahoo! Mail®, Google Mail®, Hotmail®, and other personal and business email platforms, such as Microsoft Outlook®, and the like, as well as social networking platforms, such as Tumblr®, Facebook® and Twitter® and the like. In some embodiments, at least some steps performed in Process 400 of FIG. 4 can be performed offline and/or online, as discussed in more detail below.

Process 400 beings with Step 402 where a message addressed to a recipient's inbox is received. Step 402 is performed by the receiving module 310 of the message engine 308. In some embodiments, the message can be an email message sent from one user to another user. In some embodiments, the message can be a native or in in-line advertisement message that resembles a regular email, where the native or in-line message is formatted according to the format of the message platform, system or application the user is using to send/receive messages.

In some embodiments, the message can be a digital advertisement message that contains digital content that is to be displayed in conjunction with the display of the recipient's inbox UI—for example, a message that traditionally would be displayed within a side-pane of the inbox UI. However, in such embodiments, through implementation of the message engine 308 discussed herein with reference to Process 400, such message can be analyzed and its content displayed in a tabbed window (as illustrated in FIGS. 5B-5C). An example of such type of message is discussed below in reference to FIG. 6.

In Step 404, the received message is displayed in the user's inbox. Step 404 is performed by the receiving module 310. For example, as illustrated in FIG. 5B, when user Jim Smith receives a message from sender "Car.com", the message is displayed in the message display area 504 of the user's inbox 500 as message 504a.

In Step 406, input is received with corresponds to an instruction to open the received message. Step 406 is performed by the receiving module 310. In some embodiments, the input can be user-generated input provided via any known or to be known command that initiates the opening of a message, such as, but not limited to, click, double-click, touch, haptic touch, entered command, iris-detection, voice command, and the like. In some embodiments, the input can be automatically generated by the messaging engine 308 or messaging system, application or platform, or some combination thereof. Such automatic generation of the input to open the message can be based on an identified message or content type. For example, upon receiving the message, the message can be analyzed to determine whether a certain type or category of content is present within the message. In some embodiments, such analysis comprises parsing the message and the message content and comparing the parsed information to particular criteria. Upon a determination that the type or category of content satisfies the criteria, the input can be automatically triggered to open the message. The criteria can be, but is not limited to, a message's and/or content's type, category, timing, date, sender's identity, recipient's identity, geo-spatial data, social data, logical data, format and the like, or some combination thereof.

For example, the message received is parsed and then analyzed, and determined to comprise time-sensitive promotional content. Therefore, the input to open the message (as in Step 406) can be automatically generated. As discussed below, such initial analysis of the message can be performed by the analysis module 312 implementing any known or to be known content detection, determination or identification mechanism or algorithm, such as, but not limited to, feature learning, vectorization, Gaussian recognition, Hidden Markov Models (HMM), and the like.

The input received in Step 406 triggers analysis (and in some embodiments, further analysis) of the message identified by the input. Step 408, which is performed by the analysis module 312, and in some embodiments, can involve the analysis module 312 implementing any known or to be known content detection, determination, identification or extraction mechanism or algorithm, such as, but not limited to, feature learning, vectorization, Gaussian recognition, Hidden Markov Models (HMM), and the like. Step 408 results in the identification of the message content included in the received message.

In Step 410, a tab (or as discussed above, a modal window) is automatically generated based on the message that was identified by the input from Step 406. Step 410 is performed by the display module 314. The generated tab is an embedded interface element displayable within the UI of the inbox. The generated tab is interactive and comprises displayed header (or title) information that provides an indication as to the type of content displayed within the window associated with the tab, and also provides functionality for toggling the inbox from the main view (e.g., inbox view 500 illustrated in FIGS. 5A and 5B) to the tabbed window view (illustrated in FIG. 5C). The tabbed window view is a sub-window of the inbox UI, is embedded within the inbox's UI, and overlays the main inbox view's window display when selected. In some embodiments, the tabbed window may not be embedded in the inbox UI and only overlays the display of the inbox UI (i.e., main inbox view). In some embodiments, Step 410 also involves the generation (or creation) of a displayed tab for the main inbox view, so that if/when the user switches to the tabbed window view, the user can then switch back to the main inbox view.

For example, as illustrated in FIGS. 5B-5C, as discussed above with reference to the "Car.com" example, user Jim Smith clicks on the email "Honda Price Cuts 2015—Don't Pay MSRP of $15,425" (item 504a). This results in the generation and display of the tabs 506 and 508.

It should be understood that the location, quantity and order of the tabs (506 and 508) within the inbox 500 UI should not be construed as limiting, as they are being shown in this manner as one-non-limiting example, and any orientation, quantity sequence or display configuration can occur without departing from the scope of the instant disclosure. For example, the tabs may be generated and displayed within the browser user interface of a browser window that is displaying the inbox UI. In another non-limiting example, Step 410 may only involve displaying tab 508 and not the inbox tab 506, since the user may be able to toggle back to the main inbox view by clicking on the "inbox" in the message directory 502.

In Step 412, an input is received with corresponds to an instruction (or command) to view the tabbed window. Step 412 is performed by the display module 314. In a similar manner as discussed above in relation to Step 406, in some embodiments, the input can be user-generated input; and in some embodiments, the input can be automatically generated by the messaging engine 308 or messaging system, application or platform, or some combination thereof.

The input received in Step 412 triggers the switching of the view from the inbox window view (as illustrated in FIG. 5B) to the tabbed window view (as illustrated in FIG. 5C). Step 414, which is performed by the display module 314. In some embodiments, the content of the received message that is identified in Steps 406-408 and used as a basis for generating the interactive tab (as in Step 410) is the content that is displayed within the tabbed window view (as illustrated in FIG. 5C).

For example, upon toggling the view from inbox view illustrated in FIG. 5B to the view illustrated in FIG. 5C, the content item 510 displayed is the content that is comprised within message 504a that was received and displayed in the message display area 504, as illustrated in FIG. 5B.

According to some embodiments, the displayed content displayed in the tabbed window view is the actual or entire message. In some embodiments, Steps 412-414 are automatically performed as a result of the generation of the tab in Step 410 (e.g., in response to the input in Step 406). For example, upon receiving an indication to open the message (whether automatic or user-generated), the following steps are automatically performed: the message is analyzed (Step 408), the tab is generated (Step 410) and the tabbed window associated with the generated tab is displayed (Step 412-414).

In Step 416, which is also performed by the display module 314, another input can be received to switch from the tabbed window view (illustrated in FIG. 5C) to the view of the main inbox (as illustrated in FIG. 5B). As discussed above related to Steps 406 and 412, in some embodiments, the input can be user-generated input. And, in some embodiments, the input can be automatically generated by the messaging engine 308 or messaging system, application or platform, or some combination thereof. For example, automatic input can be detected/determined upon the user receiving a new message in his/her inbox, which will trigger the instruction to switch views back to the main inbox view.

In Step 418, the input received in Step 416 triggers the switching of the view from the tabbed window view (as illustrated in FIG. 5C) back to the inbox window view (as illustrated in FIG. 5B). Step 418 is performed by the display module 314. As discussed above, the content that is displayed and associated with the tabbed window view is not deleted or removed, and the tab (item 508 in FIGS. 5B-5C) remains displayed even while the user navigates to or within his/her inbox or even triggers the opening of another tab based on the selection of another message.

In some embodiments, the tabs may close based on analysis of the content that is displayed within and associated the tabbed window. For example, if the message that was selected that triggered the generation of the interactive tab is a native ad message, as discussed above, the generated tab may close (or expire) after a predetermined period of time or resultant an action by a user. For example, such time period may be based on the content, category or type of message. For example, if the native ad message comprises content associated with Black Friday specials at a store, then after Black Friday, the tab would expire (as would the ad/message content). In another example, if the user selects the deal and executes a purchase with a one-time coupon included within the native ad display within the tabbed window, then the tab would be deleted.

In some embodiments, the message and/or message content that is associated with a tab may be stored in database 306, where such storage can be in association with a user's messaging account profile. In some embodiments such storage may involve storing a cookie or token associated with the tab, message and/or message content. In some embodiments, the cookie or token may comprise a threshold associated with a user action or time period. For example, if the tab is open for 15 days, then the tab would automatically delete because the tab's open status exceeds a predetermined time period threshold. In another non-limiting example, if the user "refreshes" or reloads his/her mailbox, then this may trigger the action threshold and automatically trigger the deletion of the tab. Storage of the information associated with a tab and/or tab window, and the activity of a user or the messaging engine 308 associated therewith can be performed by the storage module 316.

In some embodiments, when a tab is deleted, the corresponding message in the user's inbox is also deleted; and in some embodiments, despite a tab expiring or deleting, the message may remain present in the inbox.

According to some embodiments, tabbed windows may be viewed in a holistic or window preview mode that provides a preview of all open tabs. As understood by those of skill in the art, from the preview mode, a user can select a tab(s) for viewing in a full open state (e.g., maximized view), which can be effectuated within the application, program, platform or system providing the user access to the mailbox. For example, if there are three tabs open (e.g., two message tabs and the main inbox tab), a user can enter a command (e.g., selection of one or more of the tabs) and a preview of all open tabs may be displayed that enables the user to view the content of each tab and provide input as to which tab the user would like maximized on his/her device's screen.

FIG. 6 is a work flow example 600 for serving relevant digital media content associated with advertisements (e.g., digital advertisement content) based on the information associated with the identified media (or content), as discussed above in relation to FIGS. 3-5C. Such information, referred to as "message information" for reference purposes only, can include, but is not limited to, information associated with a received message, the message content displayed in the dedication portion of the inbox (e.g., the tab(s) of the inbox's UI), the identity, context and/or type of media content being rendered and/or displayed to a user, the content of such media, and the like, and/or some combination thereof.

By way of a non-limiting example, work flow 600 includes a user receiving a mail message from his friend about New York Knicks® tickets that includes a photograph of Madison Square Garden® ("MSG") which is displayed in the a tab of the user's inbox (as discussed above in relation to Process 400). Based on the information about the basketball game, the user may be provided with digital ad content related to special promotions provided by MSG® or the New York Knicks, such as, for example, coupons for specials at the concession stands.

In Step 602, message information is identified. As discussed above, the message information can be based any of the information from the message and/or message content display process outlined above with respect to FIGS. 3-5C. For purposes of this disclosure, Process 600 will refer to single provided/identified content object (e.g., text, keyword, served media file or message) as the basis for serving a digital advertisement(s); however, it should not be construed as limiting, as any number of messages, identified content items, and/or quantities of information related to applications on a user device and/or media renderable via such applications can form such basis, without departing from the scope of the instant disclosure.

In Step 604, a context is determined based on the identified message information. This context forms a basis for serving advertisements related to the message information. In some embodiments, the context can be determined by determining a category which the message information of Step 602 represents. For example, the category can be related to the content type of the media being displayed, identified or rendered within the tab(s) of the inbox. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to search for and/or render the media. Step 612. In some embodiments, the selected advertisement is sent directly to each user's computing device. In some embodiments, the selected advertisement is displayed in conjunction with the rendered and/or identified media on the user's device and/or within the application being used to search for and/or render the media. In some embodiments, the selected advertisement can be displayed in a similar manner as the displayed message content from Process 400 (e.g., in a tab/tabbed window within a user's inbox UI).

Figure 7:
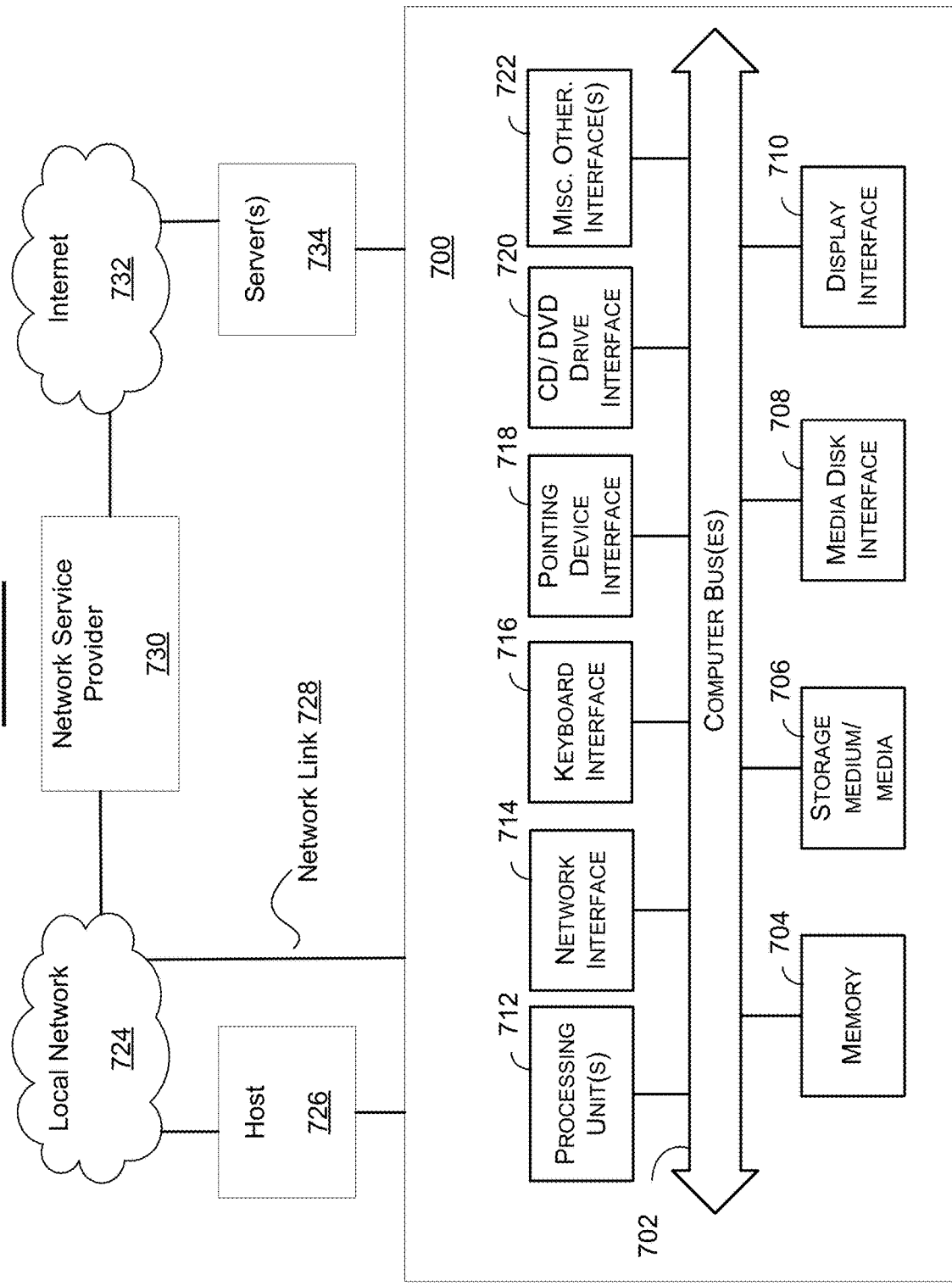
FIG. 7 is a block diagram illustrating architecture of a hardware device in accordance with one or more embodiments of the present disclosure.

As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 705, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, a message addressed to a first user comprising message content included in a body of the message provided by a second user;
   displaying, via the computing device, said message in an inbox associated with the first user, said inbox comprising an inbox user interface (UI) that comprises a main inbox window view for displaying received messages, the message being displayed along with other previously received messages within the main inbox window view;
   receiving, at the computing device within the main inbox window view, input directed to the message from the first user, said input comprising an instruction for opening said message within said inbox UI;
   analyzing, by the computing device, the message based on the received input, and identifying the message content within the body of the message;
   extracting, via the computing device, the message content within the body of the message;
   storing, via the computing device, a token associated with the extracted message content in association with a messaging account profile of the first user, the token comprising criteria related to a user action taken with regard to said inbox;
   automatically generating, via the computing device, a message tab associated with the message in response to receiving said input, said message tab linked to the token, said message tab being an interactive interface element displayable in said inbox UI, said interface element comprising functionality for switching from the main inbox window view to a tabbed window view when selected, said tabbed window view comprising an embedded sub-window of the inbox UI that displays just the extracted message content;
   modifying, via the computing device, said inbox UI by embedding said interface element within the main inbox window view of said inbox UI, said modification causing said message tab to be displayed within said main inbox window view;
   receiving, at the computing device, user input to view said tabbed window view, said user input being entered respective to the displayed message tab within said modified inbox UI;
   automatically switching, via the computing device, a view of the modified inbox UI from the main inbox window view to the tabbed window view in response to said user input, said switching comprising displaying the extracted message content in the tabbed window view;
   detecting, via the computing device, activity related to the inbox that corresponds to the criteria defined by the token; and
   automatically deleting, via the computing device, based on the detected activity, the displayed message tab and the message within the main inbox window view.

2. The method of claim 1, further comprising:
   automatically generating a main inbox tab, said main inbox tab being an interface element displayed in said inbox UI that comprises functionality for actively viewing the main inbox window view when selected.

3. The method of claim 2, further comprising:
   receiving second user input to view said main inbox window view, said second user input being entered respective to the displayed main inbox tab; and
   automatically switching the view of the modified inbox UI from the tabbed window view to the main inbox window view in response to said second user input, said switching comprising displaying said main inbox window view.

4. The method of claim 2, wherein said generation of said main inbox tab is based on said generation of the message tab.

5. The method of claim 1, wherein said tabbed window view overlays the main inbox window view when selected.

6. The method of claim 1, further comprising:
   analyzing said message to determine whether said message content corresponds to a criteria, said analysis comprising parsing said message and comparing said message content to the criteria; and
   determining, based on said comparison, whether the criteria is satisfied.

7. The method of claim 6, wherein said criteria comprises information associated with the message selected from a group consisting of:
   type, category, timing, date, message sender identity, message recipient identity, geo-spatial data, social data, logical data and format.

8. The method of claim 1, wherein said second user is a third party advertiser.

9. The method of claim 1, further comprising:
   determining a context of the message content;
   causing communication, over a network, of said context to an advertisement platform to obtain digital advertisement content associated with said context;
   receiving said digital advertisement content; and
   displaying said digital advertisement content within said modified inbox UI.

10. The method of claim 9, wherein said displayed digital advertisement content is displayed in said tabbed window view.

11. A non-transitory computer-readable storage medium tangibly encoded with computer-executable instructions, that when executed by a processor associated with a computing device, perform a method comprising:
- receiving a message addressed to a first user comprising message content included in a body of the message provided by a second user;
- displaying said message in an inbox associated with the first user, said inbox comprising an inbox user interface (UI) that comprises a main inbox window view for displaying received messages, the message being displayed along with other previously received messages within the main inbox window view;
- receiving, within the main inbox window view, input directed to the message from the first user, said input comprising an instruction for opening said message within said inbox UI;
- analyzing the message based on the received input, and identifying the message content within the body of the message;
- extracting the message content within the body of the message;
- storing a token associated with the extracted message content in association with a messaging account profile of the first user, the token comprising criteria related to a user action taken with regard to said inbox;
- automatically generating a message tab associated with the message in response to receiving said input, said message tab linked to the token, said message tab being an interactive interface element displayable in said inbox UI, said interface element comprising functionality for switching from the main inbox window view to a tabbed window view when selected, said tabbed window view comprising an embedded sub-window of the inbox UI that displays just the extracted message content;
- modifying said inbox UI by embedding said interface element within the main inbox window view of said inbox UI, said modification causing said message tab to be displayed within said main inbox window view;
- receiving user input to view said tabbed window view, said user input being entered respective to the displayed message tab within said modified inbox UI;
- automatically switching a view of the modified inbox UI from the main inbox window view to the tabbed window view in response to said user input, said switching comprising displaying the extracted message content in the tabbed window view;
- detecting activity related to the inbox that corresponds to the criteria defined by the token; and
- automatically deleting, based on the detected activity, the displayed message tab and the message within the main inbox window view.

12. The non-transitory computer-readable storage medium of claim 11, further comprising:
- automatically generating a main inbox tab, said main inbox tab being an interface element displayed in said inbox UI that comprises functionality for actively viewing the main inbox window view when selected.

13. The non-transitory computer-readable storage medium of claim 12, further comprising:
- receiving second user input to view said main inbox window view, said second user input being entered respective to the displayed main inbox tab; and
- automatically switching the view of the modified inbox UI from the tabbed window view to the main inbox window view in response to said second user input, said switching comprising displaying said main inbox window view.

14. The non-transitory computer-readable storage medium of claim 12, wherein said generation of said main inbox tab is based on said generation of the message tab.

15. The non-transitory computer-readable storage medium of claim 11, wherein said tabbed window view overlays the main inbox window view when selected.

16. The non-transitory computer-readable storage medium of claim 11, further comprising:
- analyzing said message to determine whether said message content corresponds to a criteria, said analysis comprising parsing said message and comparing said message content to the criteria; and
- determining, based on said comparison, whether the criteria is satisfied.

17. A system comprising:
- a processor; and
- a non-transitory computer-readable storage medium for tangibly storing thereon program logic for execution by the processor, the program logic comprising:
  - first receiving logic executed by the processor for receiving a message addressed to a first user comprising message content included in a body of the message provided by a second user;
  - display logic executed by the processor for displaying said message in an inbox associated with the first user, said inbox comprising an inbox user interface (UI) that comprises a main inbox window view for displaying received messages, the message being displayed along with other previously received messages within the main inbox window view;
  - second receiving logic executed by the processor for receiving, within the main inbox window view, input directed to the message from the first user, said input comprising an instruction for opening said message within said inbox UI;
  - analysis logic executed by the processor analyzing the message based on the received input, and identifying the message content within the body of the message;
  - extraction logic executed by the processor for extracting the message content within the body of the message;
  - storage logic executed by the processor for storing a token associated with the extracted message content in association with a messaging account profile of the first user, the token comprising criteria related to a user action taken with regard to said inbox;
  - generating logic executed by the processor for automatically generating a message tab associated with the message in response to receiving said input, said message tab linked to the token, said message tab being an interactive interface element displayable in said inbox UI, said interface element comprising functionality for switching from the main inbox window view to a tabbed window view when selected, said tabbed window view comprising an embedded sub-window of the inbox UI that displays just the extracted message content;
  - modifying logic executed by the processor for modifying said inbox UI by embedding said interface element within the main inbox window view of said inbox UI, said modification causing said message tab to be displayed within said main inbox window view;

third receiving logic executed by the processor for receiving user input to view said tabbed window view, said user input being entered respective to the displayed message tab within said modified inbox UI;

switching logic executed by the processor for automatically switching a view of the modified inbox UI from the main inbox window view to the tabbed window view in response to said user input, said switching comprising displaying the extracted message content in the tabbed window view detection logic executed by the processor for detecting activity related to the inbox that corresponds to the criteria defined by the token; and detection logic executed by the processor for automatically deleting, based on the detected activity, the displayed message tab and the message within the main inbox window view.

* * * * *